(12) United States Patent
Burns

(10) Patent No.: US 12,462,467 B2
(45) Date of Patent: Nov. 4, 2025

(54) HARDWARE ACCELERATION FOR MOTION BLUR WITH RAY TRACING

(71) Applicant: Apple Inc., Cupertino, CA (US)

(72) Inventor: Christopher A. Burns, Austin, TX (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 18/537,388

(22) Filed: Dec. 12, 2023

(65) Prior Publication Data

US 2025/0191275 A1 Jun. 12, 2025

(51) Int. Cl.
*G06T 15/06* (2011.01)

(52) U.S. Cl.
CPC .................... *G06T 15/06* (2013.01)

(58) Field of Classification Search
CPC ........................................................ G06T 15/06
See application file for complete search history.

(56) References Cited

U.S. PATENT DOCUMENTS

| 10,825,230 | B2 | 11/2020 | Lame et al. | |
| 11,158,112 | B1* | 10/2021 | Yeo ............... | G06T 15/06 |
| 11,663,777 | B2 | 5/2023 | Woop et al. | |
| 11,734,871 | B2 | 8/2023 | Burns | |
| 2010/0188396 | A1 | 7/2010 | Mejdrich et al. | |
| 2018/0286103 | A1* | 10/2018 | Woop ............. | G06T 1/20 |
| 2021/0287422 | A1 | 9/2021 | Saleh et al. | |
| 2022/0301254 | A1* | 9/2022 | Burns ............. | G06T 15/06 |
| 2023/0027725 | A1* | 1/2023 | Chajdas .......... | G06T 17/005 |
| 2023/0099806 | A1* | 3/2023 | Oldcorn .......... | G06T 11/20 345/419 |
| 2023/0196669 | A1* | 6/2023 | Chajdas .......... | G06T 15/06 |

OTHER PUBLICATIONS

Konstantin Shkurko et al., Time Interval Ray Tracing for Motion Blur, IEEE Transactions on Visualization and Computer Graphics, vol. 24, No. 12, pp. 3225-3238, Dec. 1, 2018, doi: 10.1109/TVCG.2017.2775241. (Year: 2017).*
International Search Report and Written Opinion in PCT Appl. No. PCT/US2024/055563 mailed Feb. 25, 2025, 9 pages.

* cited by examiner

*Primary Examiner* — Phuc N Doan
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to ray tracing and motion blur in graphics processors. In some embodiments, ray intersection accelerator circuitry is configured to perform traversal operations for an acceleration data structure (ADS) that includes hierarchical bounding volumes, where the ADS includes a first node that specifies: first coordinates of a bounding volume at a first motion blur time and second coordinates of the bounding volume at a second motion blur time. The Ray accelerator may determine a ray time interval representation indicating upper and lower bounds that represent error bounds for a quantized ray time value of a ray. Interpolation circuitry may operate on the first coordinates, the second coordinates, and the ray time interval representation to generate interpolated coordinates for the bounding volume. Box test circuitry may determine whether the ray intersected the bounding volume based on the interpolated coordinates and coordinates of the ray.

19 Claims, 10 Drawing Sheets

*Example spacetime node encoding 410*

| | | |
|---|---|---|
| Child 0 bounds; t=a | Child 0 metadata | Opcode |
| Child 0 bounds; t=b | | Origin X,Y,Z |
| ⋮ | ⋮ | Exp X,Y,Z |
| Child N-1 bounds; t=a | Child N-1 metadata | Child base |
| Child N-1 bounds; t=b | | Shader index |

*Example spatial node encoding 420*

| | | |
|---|---|---|
| Child 0 bounds | Child 0 metadata | Opcode |
| | | Origin X,Y,Z |
| ⋮ | ⋮ | Exp X,Y,Z |
| | | Child base |
| Child 2N-1 bounds | Child 2N-1 metadata | Shader index |

*FIG. 4*

HARDWARE ACCELERATION FOR MOTION BLUR WITH RAY TRACING

BACKGROUND

Technical Field

This disclosure relates generally to graphics processors and more particularly to ray tracing and motion blur.

Description of Related Art

Motion blur is a phenomenon that occurs when the image being recorded changes during recording of a single exposure. For example, a photograph of a moving freight train with a sufficiently long exposure time may show the train blurred while non-moving objects are non-blurred. In the computer graphics context, a graphics processor may simulate the motion blur effect for a frame of graphics data. In this context, a graphics primitive (e.g., a triangle) may have multiple different positions during an open shutter interval of a virtual camera (also referred to herein as a motion blur interval), and thus may affect pixel values at the multiple positions in the frame to cause a blurring effect.

Ray tracing is a rendering technique for generating an image by tracing the path of light as pixels in an image plane and simulating the effects of its encounters with virtual objects. Graphics processors that support ray tracing may utilize various types of acceleration data structures (ADSs) to efficiently determine which primitives are intersected by which rays in a graphics scene.

When both ray tracing and motion blur are both implemented, each ray is typically assigned a time stamp within a motion blur interval. In this context, testing for ray intersection with primitives that move due to motion blur may be expensive in terms of processor resources and power consumption.

BRIEF DESCRIPTION OF DRAWINGS

FIG. 4 is a diagram illustrating an example node of an acceleration data structure that includes bounds for different motion blur times, according to some embodiments.

DETAILED DESCRIPTION

Figure 1A:
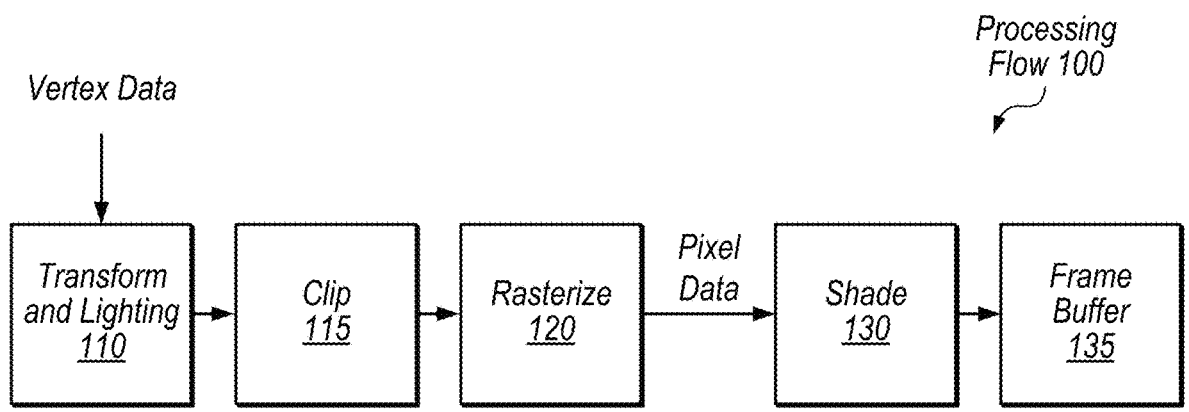
FIG. 1A is a diagram illustrating an overview of example graphics processing operations, according to some embodiments.

When combining motion blur with ray tracing, a given ray may be assigned a precise time value within the motion blur interval. Ray tracing typically uses a bounding volume hierarchy (BVH) acceleration data structure (ADS) and a ray traverses the hierarchy of progressively smaller bounding volumes (e.g., boxes) to determine whether it intersects primitives (e.g., triangles) at the leaves of the hierarchy. In this context, a naïve bounding box implementation might cover all possible positions of a primitive during the time interval, which would substantially impact performance (e.g., due to the large size of such bounding boxes, which would not provide a tight fit for fast-moving primitives, causing a substantial number of misses in triangle/primitive tests).

More advanced techniques may split the BVH into different time intervals using temporal split nodes so that a given bounding volume corresponds to a shorter time interval. Further, a graphics processor may execute a shader program to perform interpolation operations. U.S. Pat. No. 11,676,327, titled "Temporal Split Techniques for Motion Blur and Ray Intersection" and filed Mar. 18, 2021, discusses examples of such techniques.

In disclosed embodiments, at least some ADS nodes store both start and end positions for an axis-aligned bounding box, and acceleration hardware is configured to interpolate between the start and end positions to generate an interpolated box corresponding to the ray time value for intersection testing during ADS traversal. Specifically, spacetime interpolation circuitry, discussed in detail below, may generate an interpolated bounding box and provide the interpolated box to box test circuitry of a ray intersection accelerator. This may improve performance over shader-based techniques and may allow box test circuitry to remain oblivious to motion blur.

The spacetime interpolation circuitry may operate on quantized interval bounding box values where upper and lower interval values correspond to upper and lower planes of a slab of the bounding box (with three slabs per box). The ray time value is quantized (but may use at least one more bit than the quantized box coordinates) and represented as an interval (with the upper and lower bounds indicating conservative limits on the quantization error). This may provide advantageous tradeoffs between accuracy, power consumption, circuit area, and performance, in various embodiments.

In some embodiments, the ADS includes both traditional spatial nodes and spacetime nodes (that encode multiple positions at different times for a given bounding box). In embodiments, node data structures contain up to N bounding boxes and are sized to match a hardware-relevant byte length, e.g., relating to granularity and alignment of memory transfers such as a cache line size. In these embodiments, a spacetime node may include a fraction (e.g., half) of the bounding volumes included in spatial nodes. A given node may specify whether it is a spacetime or spatial node (or a parent node may specify whether its children are spacetime or spatial nodes) and the different node types may have different encodings.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
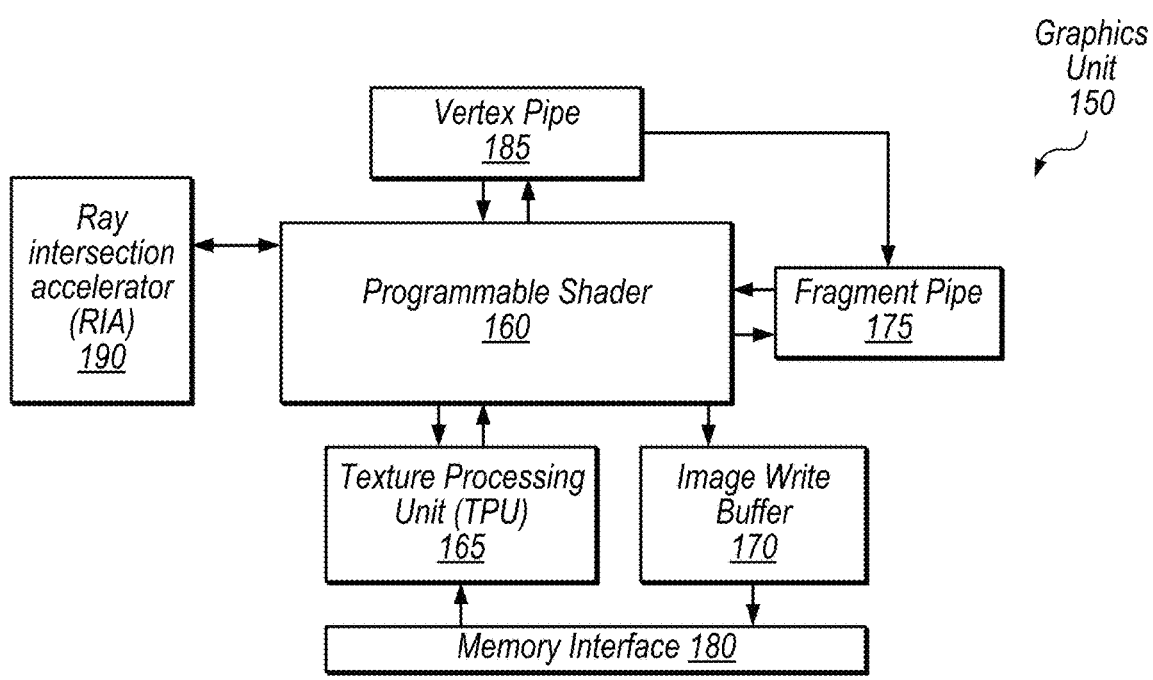
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersection accelerator (RIA) 190, which may include hardware configured to perform various ray intersection operations (e.g., for traversal of a bounding volume hierarchy acceleration data structure) in response to instruction(s) executed by programmable shader 160, as described in detail below.

Overview of Bounding Volume Interpolation and Interpolation Circuitry

Figure 2:
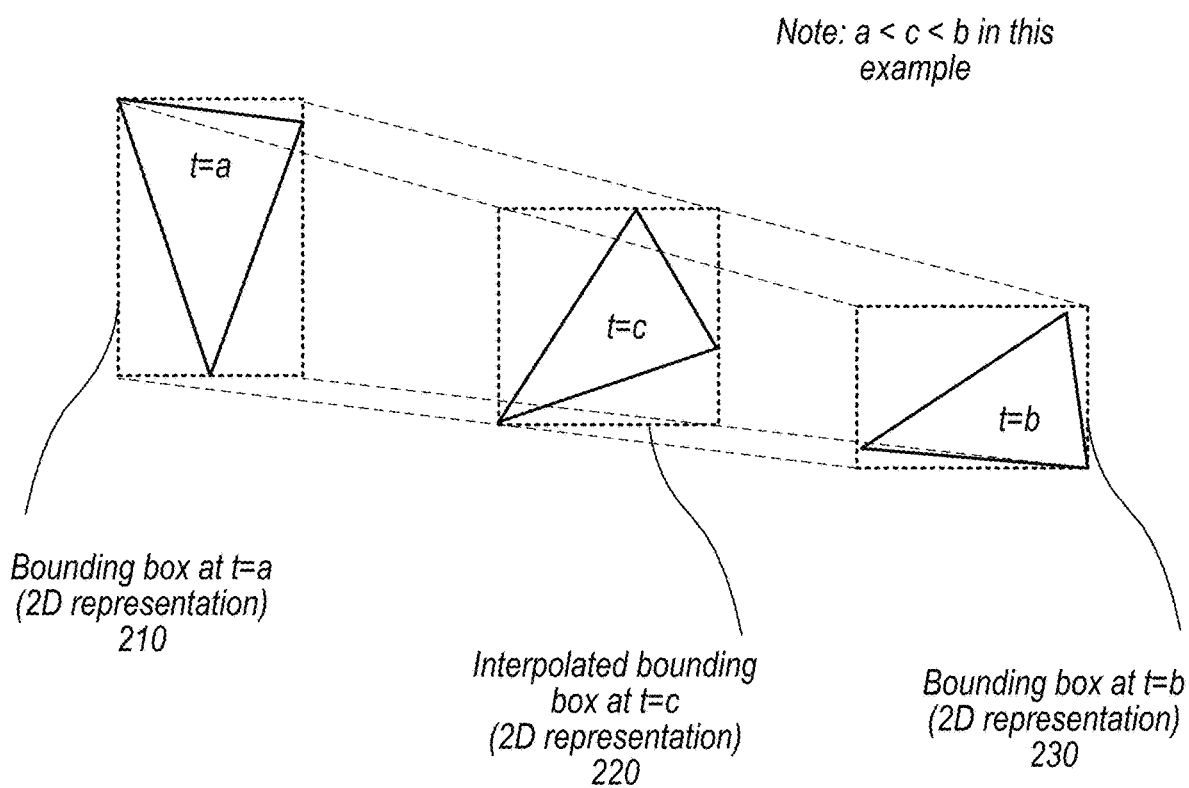
FIG. 2 is a diagram illustrating example bounding box interpolation within a motion blur interval, according to some embodiments.

FIG. 2 is a diagram illustrating example bounding box interpolation within a motion blur interval, according to some embodiments. In the illustrated example, a motion blur interval begins at time t=a and ends at time t=b. As shown, a triangular primitive has different positions in the graphics coordinate space at times t=a and t=b. Although 2D representations are shown to simplify explanation, the space may be three-dimensional (e.g., world space) and X, Y, and Z coordinates of a given vertex of the primitive may change during the motion blur interval. Note that times a and b may be the beginning and end of the overall motion blur interval for a frame of graphics data or a portion thereof (e.g., in embodiments with one or more temporal split nodes in the ADS).

In the illustrated example, bounding box 210 includes the primitive at t=a and bounding box 230 includes the primitive at t=b. While the illustrated bounding boxes are shown as two-dimensional rectangles, it is to be understood that these boxes are three-dimensional in various embodiments. For example, a given bounding box may be represented using X, Y, and Z coordinates of one corner of the box and X, Y, and Z coordinates of the opposite corner of the box.

Time t=c is between time a and time b and FIG. 2 shows an interpolated bounding box that spatially encloses the primitive at this time. Note that motion blur interpolation may be an estimate, e.g., using linear interpolation (or some other interpolation technique) even through the primitive may theoretically move in a different manner between its beginning and end points during the motion blur interval. In some embodiments, the interpolation used to generate the interpolated bounding box 220 for box intersection testing is the same interpolation technique used to generate the interpolated primitive for primitive intersection testing (e.g., both linear).

Note that while a single primitive is shown, similar techniques may be used for interior nodes to tightly enclose a temporal sub-tree that may include various lower levels of bounding volumes and multiple primitives.

Figure 3:
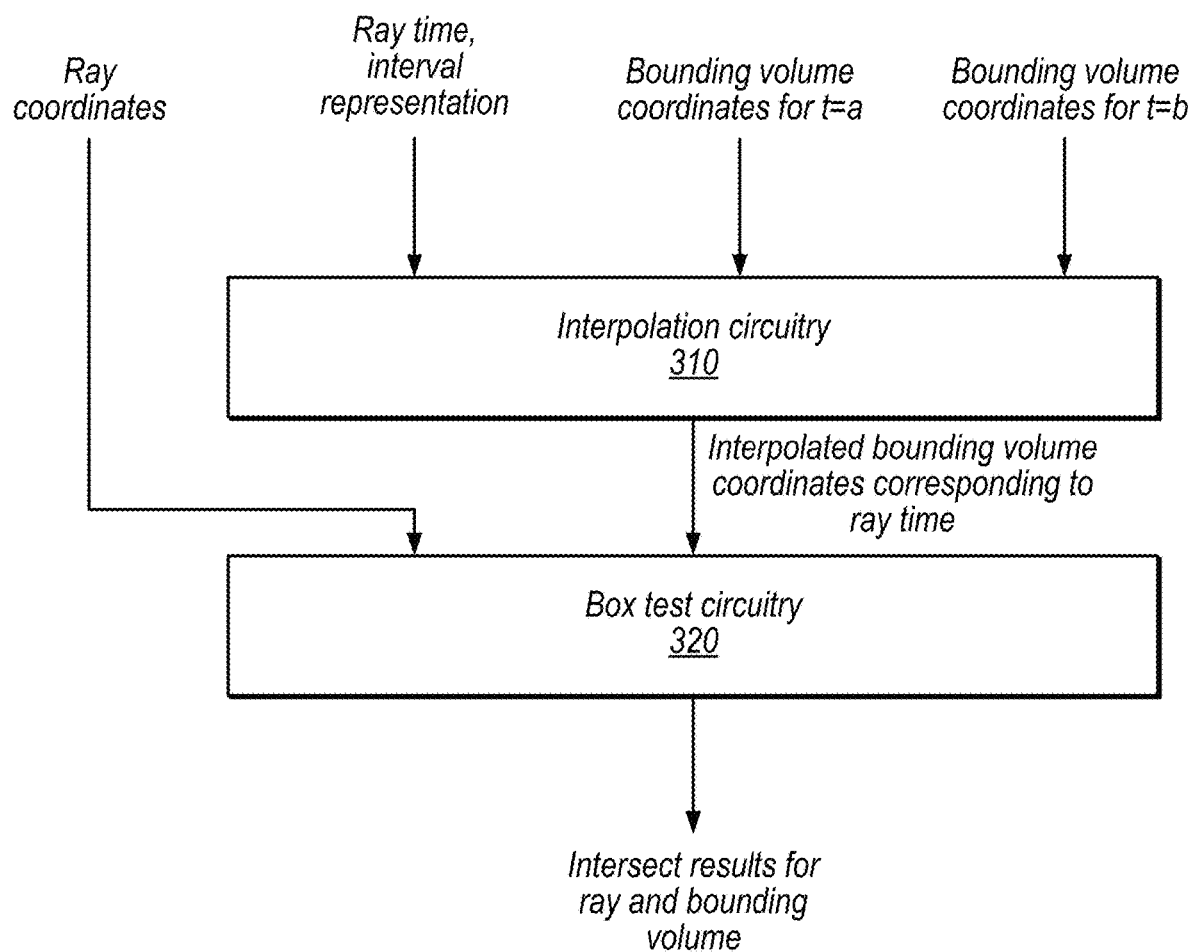
FIG. 3 is a block diagram illustrating example interpolation circuitry that generates interpolated bounding volume coordinates, according to some embodiments.

FIG. 3 is a block diagram illustrating example interpolation circuitry configured to generate interpolated bounding volume coordinates, according to some embodiments. In the illustrated embodiment, ray intersection accelerator 190 includes interpolation circuitry 310 and box test circuitry 320.

Box test circuitry 320, in some embodiments, is configured to test ray coordinates against received bounding volume coordinates to determine whether the ray intersects the received bounding volume. In some embodiments, box test circuitry 320 is traditional in the sense that it may be time-oblivious. Therefore, box test circuitry 320 may perform the same operations for traditional bounding volumes as for interpolated bounding volumes. As shown, the received bounding volume coordinates may be interpolated to generate an interpolated bounding volume corresponding to the ray time.

Interpolation circuitry 310, in the illustrated embodiments, is configured to receive the ray time as an interval representation (representing upper and lower bounds on quantization error), bounding volume coordinates for t=a, and bounding volume coordinates for t=b. Interpolation circuitry 310 is configured to interpolate between the bounding volumes at t=a and t=b to generate interpolated bounding volume coordinates. Example interpolation computations and a more detailed example implementation of interpolation circuitry 310 and are discussed below with reference to FIG. 6.

Disclosed hardware interpolation may provide substantial performance improvements relative to software interpolation, with limited area increases. In particular, disclosed techniques may provide spatially tight bounds of interpolated geometry, which may reduce the number of ray/primitive intersection tests performed for a given workload. Note that for non-motion-blur workloads, interpolation circuitry 310 may be clock gated and the processor may provide bounding volume coordinates directly to box test circuitry 320.

Example Node Encodings

FIG. 4 is a diagram illustrating an example ADS node data structure that includes bounds for different motion blur times, according to some embodiments. In the illustrated example, an ADS supports both spatial nodes and spacetime nodes. This may allow providing tighter fits for motion blur primitives in parts of the ADS where a closer fit is important while using traditional nodes in others, for example. In the illustrated example, encoding 410 is for spacetime nodes and encoding 420 is for spatial nodes.

Encoding 410, in the illustrated example, includes bounds for up to N children, including bounds at t=a and at t=b for a given child. The node opcode may indicate the number of leaf children (e.g., 0 to N), the stride between leaves, whether the node is a spacetime node or a spatial node, and whether the node is a special node (e.g., for instance nodes that indicate instance transforms or temporal split nodes). Note that special nodes may be handled in accelerator hardware, by shader programs, or both, in various embodiments. Disclosed interpolation techniques may be utilized for both special and traditional nodes.

The origin X, Y, and Z coordinates and exponent X, Y, and Z coordinates may define a quantized coordinate frame for the node within which the child bounds may be interpreted. In some embodiments, the children are quantized, axis-aligned bounding boxes that are defined by their upper and lower corners (e.g., with six values per box in an X, Y, Z, coordinate space). In some embodiments, these values are represented as fixed-point offsets relative to a common origin (specified by the origin X, Y, Z fields) and scale factor (e.g., a power-of-2 scale factor specified by the exponent X, Y, Z fields). The origin values may be represented as signed floating-point values, for example. This may allow encoding of all child nodes relative to parent bounds, which may avoid progressive loss of precision as the boxes become smaller in deeper parts of the tree. The parent container—the origin and exponents—may be referred to as the quantization frame for the node. The child base field may indicate a child base address, relative to the base address of the BVH tree, after which the children of the node may be stored.

The shader index field may indicate a shader to be used to process leaf children (e.g., a driver shader or user-specified shader that performs ray/primitive intersection tests). Such shaders may be used both in embodiments in which RIA 190 does not support hardware ray/primitive intersection tests and in embodiment in which RIA 190 supports acceleration of those tests but permits software ray/primitive intersection tests in certain scenarios.

Encoding 410 also includes metadata for a given child, which may indicate whether a child is a leaf node or an interior node, whether the child is valid, a BVH offset (e.g., relative to the child base), the number of leaves of that child, etc. Note that leaf children may be encoded first in the BVH address space, followed by interior children, or vice versa.

Encoding 420, in the illustrated example, includes similar fields to encoding 410 but includes bounds for up to 2N children. Note that in embodiments in which encodings 410 and 420 occupy the same number of bits, certain bits of encoding 410 may not be used (e.g., because fewer metadata bits may be used when fewer children are encoded).

In various embodiments, the disclosed encodings use the same number of cache lines for spacetime nodes and spatial nodes, but with different numbers of children encoded. This may advantageously limit increases in ADS size and limit adverse effects on cache performance while improving performance for workloads with both motion blur and ray tracing.

Figure 5:
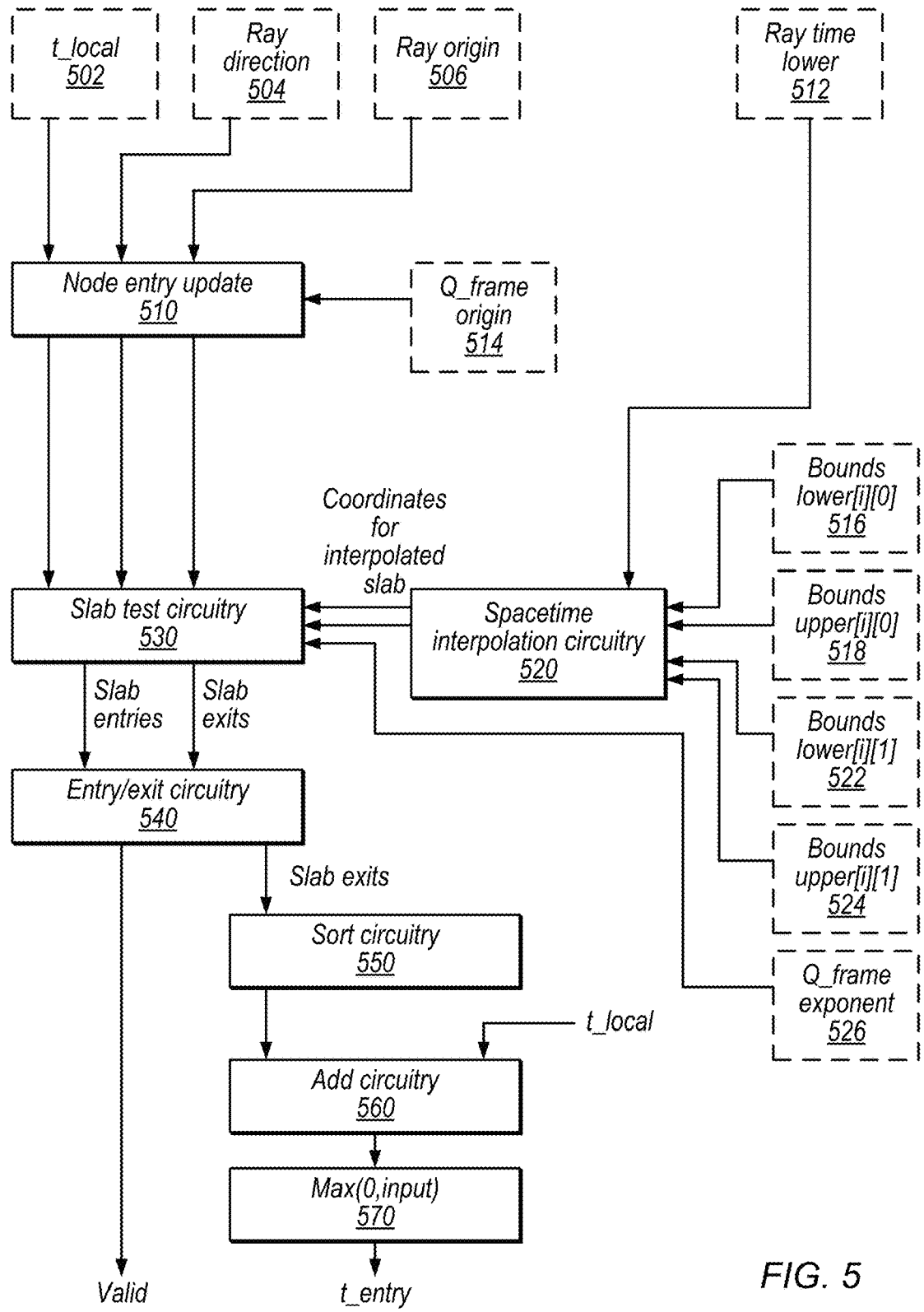
FIG. 5 is a block diagram illustrating a detailed example of ray intersection accelerator circuitry that includes spacetime interpolation circuitry, according to some embodiments.

Detailed Example Ray Intersection Accelerator Circuitry and Interpolation Circuitry FIG. 5 is a block diagram illustrating a detailed example of ray intersection accelerator circuitry that includes spacetime interpolation circuitry, according to some embodiments. In the illustrated example, RIA 190 includes node entry update circuitry 510, spacetime interpolation circuitry 520 (which is one example of interpolation circuitry 310), slab test circuitry 530, entry/exit circuitry 540, sort circuitry 550, add circuitry 560, and max circuitry 570. In the illustrated example, RIA 190 performs intersection tests based on the following information: t_local 502, ray direction 504, ray origin 506, ray time lower bound 512, quantization frame origin 514, upper and lower bounds 516, 518, 522, and 524, and quantization frame exponent 526. As discussed above, some of these values are stored in the BVH nodes (e.g., values 514-526) while others may be stored on a traversal stack for a depth-first search of the ADS (e.g., value 502) or a ray core space (e.g., values 504-512).

Node entry update circuitry 510, in some embodiments, is configured to utilize the t_local value 502, the ray direction 504, the ray origin 506, and the quantization frame origin 514 to determine an updated ray origin that is closer to the bounds being tested than the original ray origin. The t_local value may be a ray parametric value that indicates the point along the ray at which the ray intersected the parent node's bounds. Using this value to compute a new ray origin may reduce the magnitudes of differences between the origin and bounding box planes, which may facilitate utilization of lower-precision arithmetic to reduce power consumption and area. The new ray origin may be represented using interval values, representing upper and lower values that account for potential floating-point rounding error. In some embodiments, node entry update circuitry 510 includes three replicated sets of arithmetic circuits, one for each coordinate direction in three-dimensional space. As shown, node entry update 510 may propagate its input values (with potential adjustments, e.g., to the ray origin) to slab test circuitry 530. Generally, this information corresponds to the ray inputs to the ray/box intersection tests implemented by slab test circuitry 530.

Spacetime interpolation circuitry 520, in the illustrated embodiment, is configured to provide the box inputs to the ray/box intersection tests implemented by slab test circuitry 530. In the illustrated example, the bounds [i][j] represent the bounds in direction i (e.g., one of the X, Y, and Z directions) at time j (e.g., 0 or 1 for the full motion blur interval or more generally the start and end of the currently-considered portion of the motion blur interval). The upper and lower bounds for a given direction and time define a slab (a pair of planes). Note that these bounds may be conservative in the sense that the values include any quantization errors (generally, any rounding may be performed in the outward direction such that an original box will always be within a quantized representation).

Spacetime interpolation circuitry 520 receives the interval representations of the slabs in information 516-524 and also receives information specifying a ray time interval. In the illustrated example, ray time lower 512 is the lower bounds at t=a and t=b) with an interval interpolant (the ray time) produces one result interval (the interpolated slab).

The following pseudocode provides example operations performed circuitry 520 for one box. In this example, the ray time is quantized as an 8-bit interval and the bounds are quantized as 7-bit values. Note that FIG. 6, discussed in detail below, shows example circuitry that may implement these operations.

Figure 6:
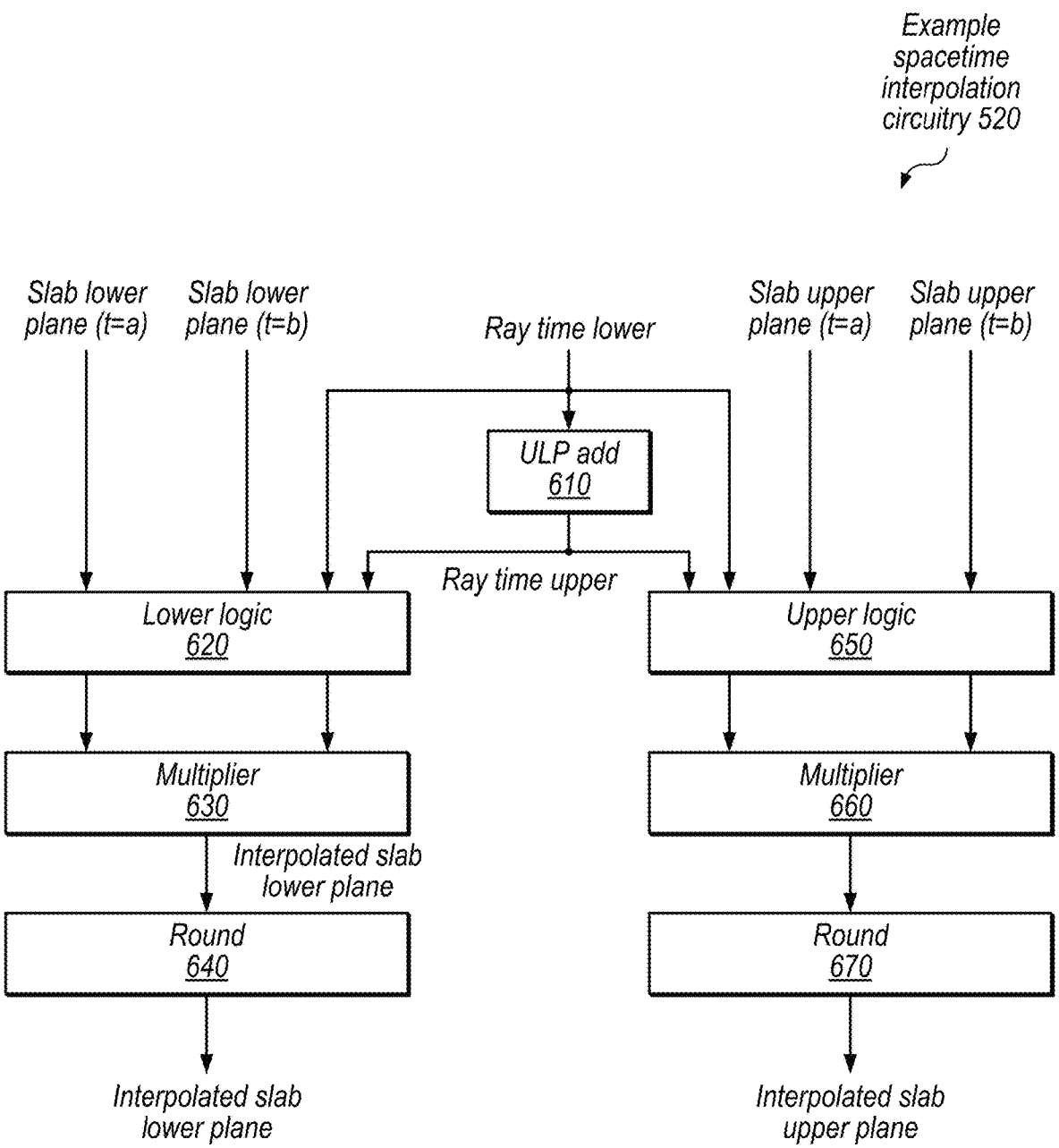
FIG. 6 is a block diagram illustrating a detailed example implementation of spacetime interpolation circuitry, according to some embodiments.

```
// Takes boxes at childSlots (childSlot*2, childSlot*2+1) and conservatively interpolates
// them using the time interval (timeLowerBound, timeLowerBound+1), then dequantizes
// the result
AABBox3ui quantizedChildBoundsAtApproximateTime (int childSlot, uint8_t
timeLowerBound) const {
    AABBox3ui bounds0 = quantizedChildBounds(childSlot);
    AABBox3ui bounds1 = quantizedChildBounds(childSlot+childSlotSize);
    assert(bounds0.upper[0] < 256); assert(bounds0.lower[0] <= bounds0.upper[0]);
    assert(bounds1.upper[0] < 256); assert(bounds1.lower[0] <= bounds1.upper[0]);
    assert(bounds0.upper[1] < 256); assert(bounds0.lower[1] <= bounds0.upper[1]);
    assert(bounds1.upper[1] < 256); assert(bounds1.lower[1] <= bounds1.upper[1]);
    assert(bounds0.upper[2] < 256); assert(bounds0.lower[2] <= bounds0.upper[2]);
    assert(bounds1.upper[2] < 256); assert(bounds1.lower[2] <= bounds1.upper[2]);
    Interval<uint32_t> xt = spacetimeSlabInterpolator(bounds0.lower[0],
bounds0.upper[0], bounds1.lower[0], bounds1.upper[0], timeLowerBound);
    Interval<uint32_t> yt = spacetimeSlabInterpolator(bounds0.lower[1],
bounds0.upper[1], bounds1.lower[1], bounds1.upper[1], timeLowerBound);
    Interval<uint32_t> zt = spacetimeSlabInterpolator(bounds0.lower[2],
bounds0.upper[2], bounds1.lower[2], bounds1.upper[2], timeLowerBound);
    return AABBox3ui(
Vector3ui(xt.upper, yt.upper, zt.upper),
Vector3ui(xt.lower, yt.lower, zt.lower));
}
// The spacetimeSlabInterpolator code below represents operations by circuitry that is
replicated three times for a given box
Interval<uint32_t> ABVH8Node::spacetimeSlabInterpolator (uint8_t x0_lower,
uint8_t x0_upper, uint9_t x1_lower, uint8_t x1_upper, uint8_t rayTimeLower) const {
    // x0, x1 are in range [0, 127] (7b unsigned integer intervals)
    // rayTime is range [0, 255] (8b unsigned integer interval)
    assert(rayTimeLower <= 255);
    assert(x0_lower >= 0 && x0_lower <= 127);
    assert(x1_lower >= 0 && x1_lower <= 127);
    assert(x0_upper >= 0 && x0_upper <= 127);
    assert(x1_upper >= 0 && x1_upper <= 127);
// The following line may be implemented in hardware by element 610 of FIG. 6
    const uint8_t rayTimeUpper = rayTimeLower < 255 ? rayTimeLower+1 : 255;
// The following line may be implemented in hardware by elements 620 and 630
of FIG. 6
    const int32_t lowerPrecise = ((int32_t)x0_lower << 8) + (x0_lower < x1_lower ?
rayTimeLower : rayTimeUpper) * ((int32_t)x1_lower - (int32_y)x0_lower);
// The following line may be implemented in hardware by elements 650 and 660
of FIG. 6
    const int32_t upperPrecise = ((int32_t)x0_upper << 8) + (x0_upper < x1_upper ?
rayTimeUpper : rayTimeLower) * ((int32_t)x1_upper - (int32_t)x0_upper);
// The following line may be implemented in hardware by element 640 of FIG. 6
    const int32_t lower = lowerPrecise >> 8;    // round to 7b, towards zero
// The following line may be implemented in hardware by element 670 of FIG. 6
    const int32_t upper = min(127, (upperPrecise >> 8)+1);// round to 7b, towards inf
    assert(lower >= 0);
    assert(upper >= 0);
    assert(lower >= min(x0_lower, x1_lower) && lower < upper && upper <=
max(x0_upper, x1_upper)+1);
    return Interval<uint32_t>(lower, upper);
}
``` of the ray time interval and spacetime interpolation circuitry is configured to imply the upper bound (e.g., as 1 unit of least precision (ULP) greater than the lower bound). In some embodiments, a slab is encoded using unsigned M bit values and the ray time lower bound is an M+1 bit value (or more generally, represented using at least one more bit of precision than the slab values). If three slabs represent each box, the interpolation logic of circuitry 520 may be replicated three times for a given box (or 3N times for a node, where N is the number of potential child boxes for a spacetime node). Generally, interpolating two interval quantities (a slab Note that a straightforward interpolation of two intervals with an interval would use four multipliers for each of two interval products. In some embodiments, however, all values are signed which may reduce the number of multipliers by half. Further, only half of the outputs are needed (e.g., the device may need only the lower bounds of the interpolated lower slab-plane and only the upper bounds of the interpolated upper slab plane). By determining which outputs are needed before computing the products, the number of multipliers may be reduced by half again. Therefore, in some embodiments, only two multipliers are implemented in hardware to compute a given interpolated slab, as shown in FIG. 6 and as reflected in lines 45 and 47 of the pseudocode above.

Slab test circuitry 530, in some embodiments, is configured to test for intersection between a ray and an interpolated slab, based on the inputs from node entry update circuitry 510, spacetime interpolation circuitry 520, and the quantization frame exponent 526. In the illustrated embodiment, slab test circuitry 530 provides entry and exit information for each slab. Slab test circuitry 530 may include three times the max number of children in order to test all slabs of all children of a spatial node in parallel. Half of these slab testers may not be used for spacetime nodes, however, and may be clock gated when processing a spacetime node.

Entry/exit circuitry 540, in the illustrated embodiment, is configured to evaluate the entries and exits for a given box and output a valid signal that indicates whether an intersection was detected. An instance of entry/exit circuitry 540 may be included for each potential child node.

Sort circuitry 550, in the illustrated embodiment, is configured to sort the slab exits, e.g., based on their distance from the updated ray origin. Add circuitry 560 and max circuitry 570, in the illustrated embodiment, is configured to generate a new t_entry value that may become the t_local for the child nodes (and max circuitry 570 may push this value onto the traversal stack).

Note that various circuitry of FIG. 5 may be implemented as if hardware interpolation did not occur. For example, node entry update 510, slab test circuitry 530, and entry/exit circuitry 540 may be implemented using traditional techniques because spacetime interpolation circuitry 520 provides interpolated slabs such that those blocks can remain time-oblivious. This may simplify implementation and avoid excessive increases in circuit area while supporting hardware motion blur interpolation.

FIG. 6 is a block diagram illustrating an example implementation of spacetime interpolation circuitry, according to some embodiments. In the illustrated example, spacetime interpolation circuitry 520 includes ULP add circuitry 610, lower logic 620, upper logic 650, multiplier circuitry 630 and 660, and round circuitry 640 and 670.

In the illustrated example, spacetime interpolation circuitry 520 is configured to generate a lower plane and an upper plane for an interpolated slab based on slab upper and lower planes at times t=a and t=b and a ray time lower value. As shown, circuitry 520 may generate a quantized interpolated slab using no more than two integer multipliers.

ULP add circuitry 610, in some embodiments, is configured to generate the ray time upper bound by adding some multiple of the ULP to the ray time lower bound. In some embodiments, circuitry 610 adds one ULP, but other multiples or fractions of ULP may be added in other embodiments to generate a value for the ray time upper in accordance with the manner in which the quantized ray time lower was generated. Circuitry 610 may implement a line of the pseudocode above, as explained in the comments to the pseudocode.

Lower logic 620, in some embodiments, is configured to generate a precise lower value based on the lower plane of the slab at the start and end times within which the ray time falls. Logic 620 may implement a portion of a line of the pseudocode above and may include logic to determine which outputs are needed.

Multiplier 630, in some embodiments, is configured to perform an integer multiply on inputs provided by lower logic 620. Multiplier 630 may implement a multiply operation of the pseudocode above.

Round circuitry 640, in some embodiments, is configured to round the output of the multiplier (which represents the interpolated slab lower plane). Circuitry 640 may implement a round operation of the pseudocode above.

Upper logic 650, multiple 660, and round circuitry 670 may perform similar operations to circuitry 620, 630, and 640 but on the upper plane of the slab.

Example Method

Figure 7:
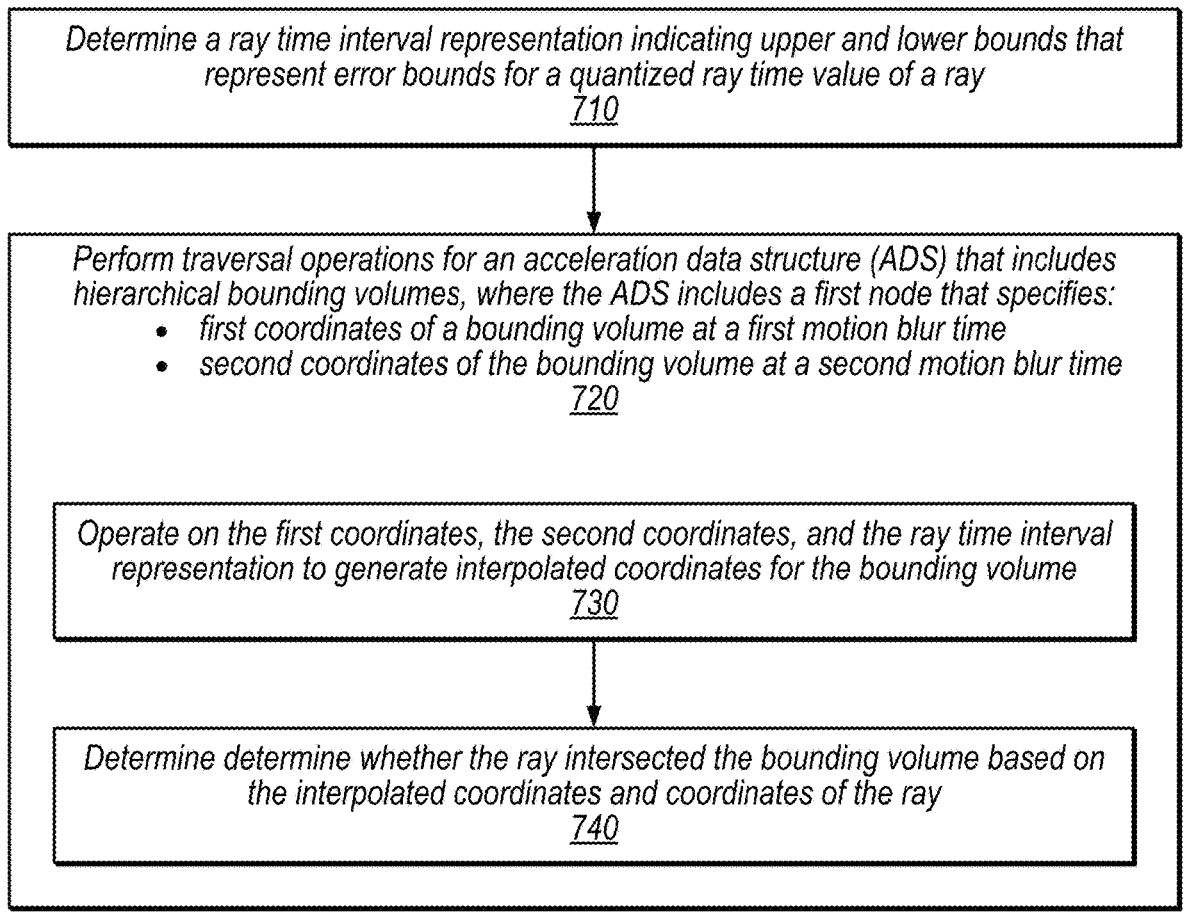
FIG. 7 is a flow diagram illustrating an example method, according to some embodiments.

FIG. 7 is a flow diagram illustrating an example method, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, the device (e.g., interpolation circuitry) determines a ray time interval representation indicating upper and lower bounds that represent error bounds for a quantized ray time value of a ray. In some embodiments, ray intersection accelerator circuitry is configured to store a first bound of upper and lower bounds of the ray time interval representation and imply a second bound of the ray time interval representation.

At 720, in the illustrated embodiment, a computing device (e.g., RIA 190 of graphics processor 150) performs traversal operations for an acceleration data structure (ADS) that includes hierarchical bounding volumes, where the ADS includes a first node that specifies: first coordinates of a bounding volume at a first motion blur time and second coordinates of the bounding volume at a second motion blur time.

In some embodiments, the first node includes an indication that the first node is a spacetime node and the second node includes an indication the second node is a spatial node that does not include coordinates for its bounding volumes at different times. In some embodiments, the ADS encodes bounding volumes for a larger number of child nodes in spatial nodes than in spacetime nodes. In some embodiments, the first motion blur time and the second motion blur time cover a proper sub-interval of an overall motion blur interval, due to a temporal split node that is higher in the ADS than the first node.

At 730, in the illustrated embodiment, the device (e.g., the interpolation circuitry) operates on the first coordinates, the second coordinates, and the ray time interval representation to generate interpolated coordinates for the bounding volume. In some embodiments, the quantized ray time value is represented using at least one more bit than quantized coordinates for the bounding volume.

In some embodiments, interpolation circuitry, for an interpolation operation that takes the ray time interval and coordinates of a plane as inputs, generates coordinates of a single plane as an output. In some embodiments, interpolation circuitry is configured to operate on an input that indicates quantization frame information associated with quantization of the bounding volume.

At 740, in the illustrated embodiment, the device (e.g., box test circuitry) determines whether the ray intersected the bounding volume based on the interpolated coordinates and coordinates of the ray.

In some embodiments, clock gate circuitry is configured to clock gate a portion of the box test circuitry when operating on a spacetime node. In some embodiments, box test circuitry is configured to perform slab tests and the interpolated coordinates indicate multiple interpolated slabs. In some embodiments, interpolation circuitry includes at most two multipliers configured to generate a given interpolated slab of the multiple interpolated slabs.

In some embodiments, a non-transitory computer-readable medium has instructions stored thereon that are executable by a computing device to perform operations comprising: generating an acceleration data structure (ADS) that includes hierarchical bounding volumes for a graphics scene. In some embodiments, the ADS includes a spacetime node and a spatial node and the spacetime node includes: first coordinates of a first bounding volume at a first motion blur time and second coordinates of the first bounding volume at a second motion blur time. In some embodiments, the spatial node includes coordinates of a second bounding volume for a single point in time.

Example Device

Figure 8:
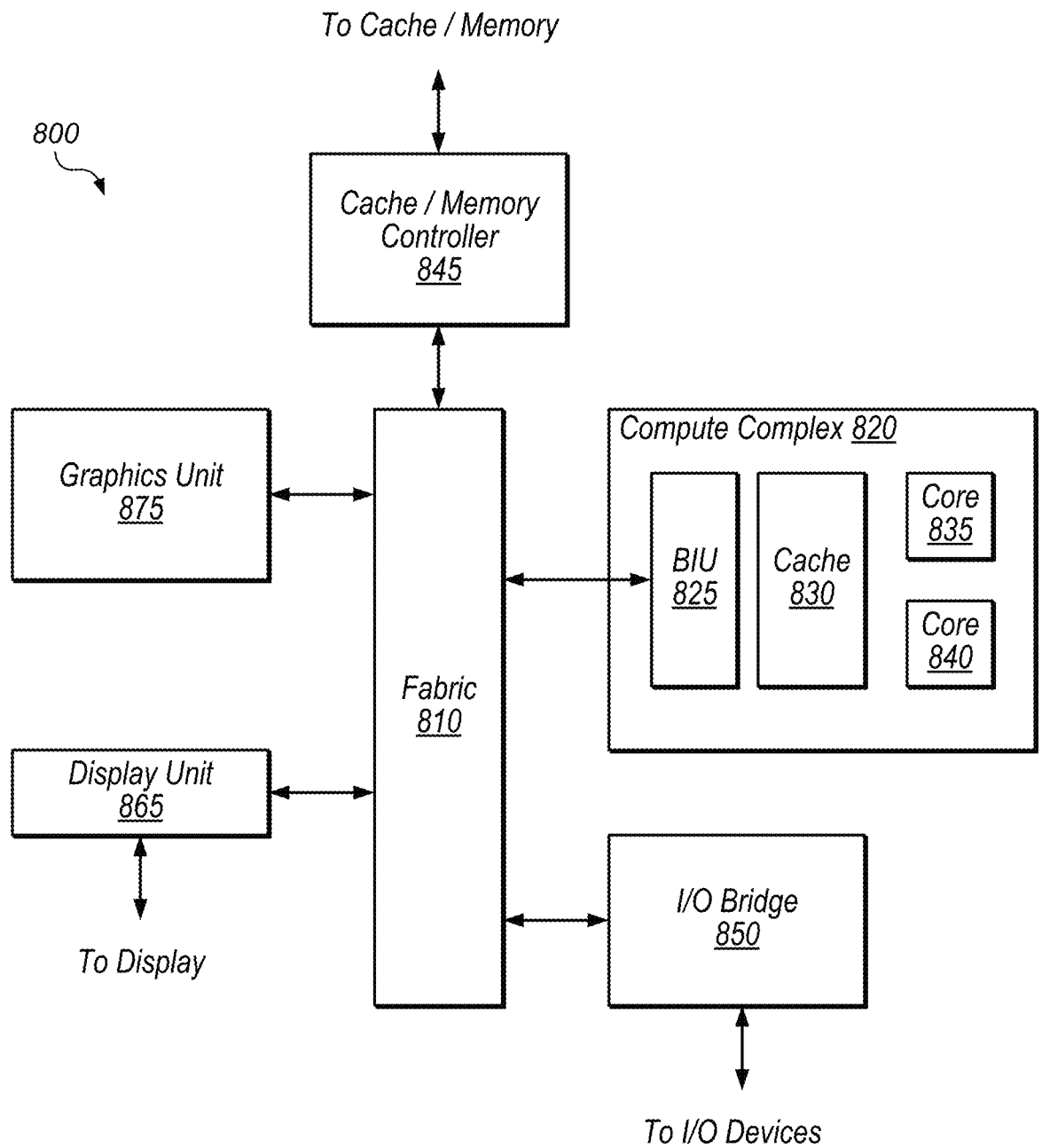
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may improve performance, reduce power consumption, or both for graphics unit 875 for workloads with both ray tracing and motion blur.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
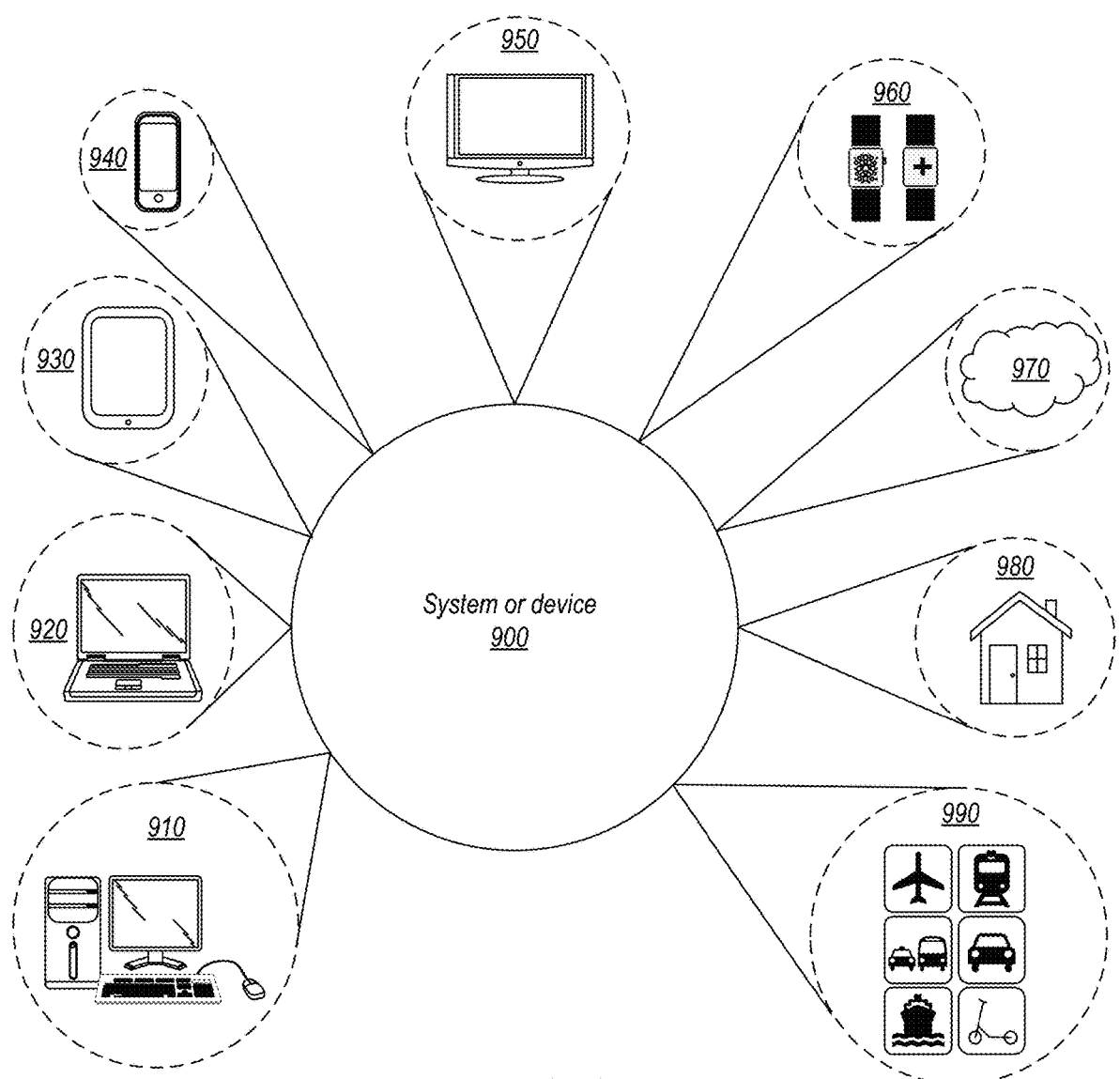
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
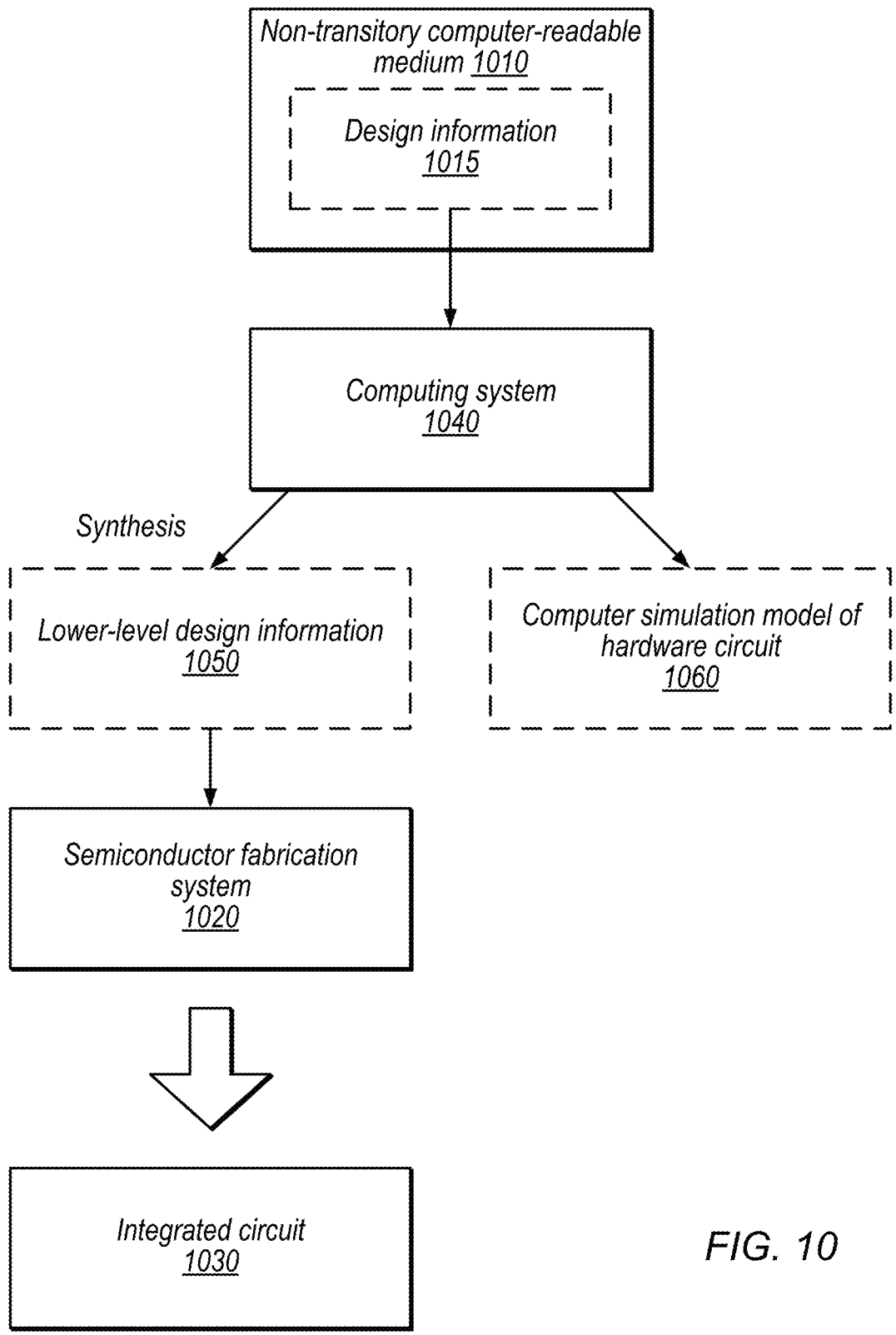
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1B, 3, 5-6, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
ray intersection accelerator circuitry configured to:
determine a ray time interval representation indicating upper and lower bounds that represent error bounds for a quantized ray time value of a ray; and
perform traversal operations for an acceleration data structure (ADS) that includes hierarchical bounding volumes, wherein the ADS includes a first node that specifies:
first coordinates of a bounding volume at a first motion blur time; and
second coordinates of the bounding volume at a second motion blur time;

wherein the ray intersection accelerator circuitry includes:
interpolation circuitry configured to operate on the first coordinates, the second coordinates, and the ray time interval representation to generate interpolated coordinates for the bounding volume; and
box test circuitry configured to determine whether the ray intersected the bounding volume based on the interpolated coordinates and coordinates of the ray.

2. The apparatus of claim 1, wherein:
the first node includes an indication that the first node is a spacetime node; and
the ADS includes a second node that includes an indication the second node is a spatial node that does not include coordinates for its bounding volumes at different times.

3. The apparatus of claim 2, wherein the ADS encodes bounding volumes for a larger number of child nodes in spatial nodes than in spacetime nodes.

4. The apparatus of claim 3, further comprising:
clock gate circuitry configured to clock gate an unused portion of the box test circuitry when operating on a spacetime node.

5. The apparatus of claim 1, wherein:
the box test circuitry is configured to perform slab tests and the interpolated coordinates indicate multiple interpolated slabs; and
the interpolation circuitry includes at most two multipliers configured to generate a given interpolated slab of the multiple interpolated slabs.

6. The apparatus of claim 1, wherein the ray intersection accelerator circuitry is configured to:
store a first bound of upper and lower bounds of the ray time interval representation; and
imply a second bound of the ray time interval representation based on the stored first bound.

7. The apparatus of claim 1, wherein the interpolation circuitry is configured, for an interpolation operation that takes the ray time interval and coordinates of a plane as inputs, generate coordinates of a single plane as an output.

8. The apparatus of claim 1, wherein the quantized ray time value is represented using at least one more bit than quantized coordinates for the bounding volume.

9. The apparatus of claim 1, wherein the interpolation circuitry includes multiple slab interpolators configured to generate interpolated slab coordinates for multiple slabs in parallel.

10. The apparatus of claim 1, wherein the first motion blur time and the second motion blur time cover a proper sub-interval of an overall motion blur interval, due to a temporal split node that is higher in the ADS than the first node.

11. A non-transitory computer-readable medium having instructions stored thereon that are executable by a computing device to perform operations comprising:
generating an acceleration data structure (ADS) that includes hierarchical bounding volumes for a graphics scene;
wherein:
the ADS includes a first node that is a spacetime node and a second node that is a spatial node;
the spacetime node includes:
first coordinates of a first bounding volume at a first motion blur time; and
second coordinates of the first bounding volume at a second motion blur time;
the spatial node includes coordinates of a second bounding volume for a single point in time;
the first node includes an indication that the first node is a spacetime node; and
the second node includes an indication the second node is a spatial node that does not include coordinates for its bounding volumes at different times.

12. The non-transitory computer-readable medium of claim 11 wherein the ADS encodes bounding volumes for a larger number of child nodes in spatial nodes than in spacetime nodes.

13. The non-transitory computer-readable medium of claim 11, wherein the first node includes quantization frame information associated with quantization of the bounding volume.

14. The non-transitory computer-readable medium of claim 11, wherein the first motion blur time and the second motion blur time cover a proper sub-interval of an overall motion blur interval, due to a temporal split node that is higher in the ADS than the first node.

15. A method, comprising:
determining, by ray intersection accelerator circuitry of a computing device, a ray time interval representation indicating upper and lower bounds that represent error bounds for a quantized ray time value of a ray;
performing, by the ray intersection accelerator circuitry, traversal operations for an acceleration data structure (ADS) that includes hierarchical bounding volumes, wherein the ADS includes a first node that specifies:
first coordinates of a bounding volume at a first motion blur time; and
second coordinates of the bounding volume at a second motion blur time;
wherein the traversal operations include:
operating, by interpolation circuitry of the ray intersection accelerator circuitry, on the first coordinates, the second coordinates, and the ray time interval representation to generate interpolated coordinates for the bounding volume; and
determining, by box test circuitry of the ray intersection accelerator circuitry, whether the ray intersected the bounding volume based on the interpolated coordinates and coordinates of the ray.

16. The method of claim 15, wherein:
the interpolated coordinates indicate multiple interpolated slabs; and
generation of the interpolated coordinates is performed by at most two multipliers of the interpolation circuitry.

17. The method of claim 15, wherein the ray intersection accelerator circuitry stores a first bound of upper and lower bounds of the ray time interval representation and implies a second bound of the ray time interval representation.

18. The method of claim 15, wherein the quantized ray time value is represented using at least one more bit than quantized coordinates for the bounding volume.

19. The method of claim 15, wherein the operating is based on quantization frame information associated with quantization of the bounding volume.

* * * * *